United States Patent [19]

Kyoosei et al.

[11] Patent Number: 4,668,209
[45] Date of Patent: May 26, 1987

[54] PLASTIC-SURROUNDED BEARING

[75] Inventors: Noriyuki Kyoosei, Chigasaki; Kenro Sato, Fujisawa, both of Japan

[73] Assignee: Nippon Seiko Kabushiki Kaisha, Tokyo, Japan

[21] Appl. No.: 795,848

[22] Filed: Nov. 7, 1985

[30] Foreign Application Priority Data

Nov. 12, 1984 [JP] Japan ............ 59-170435[U]

[51] Int. Cl.⁴ ............ F16H 55/48; B29C 45/14
[52] U.S. Cl. ............ 474/190; 474/199;
264/328.8; 264/328.12; 425/573
[58] Field of Search ........... 264/242, 273, 274, 328.12, 264/328.8; 474/190, 198, 199, 188, 166; 425/573, 577; 301/63 PW; 29/159 R

[56] References Cited

U.S. PATENT DOCUMENTS

| 3,199,364 | 8/1965 | Dew | 301/63 PW |
|---|---|---|---|
| 3,523,991 | 8/1970 | Tucker | 425/577 X |
| 3,666,322 | 5/1972 | Pickron | 301/63 PW |
| 3,990,136 | 11/1976 | Hishida | 29/159 R X |
| 4,490,128 | 12/1984 | Weiss et al. | 29/159 R X |
| 4,497,766 | 2/1985 | Olsson et al. | 264/328.12 |
| 4,571,226 | 2/1986 | Molloy et al. | 474/190 |
| 4,600,400 | 7/1986 | Hallerbäck | 474/166 |

FOREIGN PATENT DOCUMENTS 2554042  5/1985  France ............ 264/328.12

Primary Examiner—Stephen J. Novosad
Assistant Examiner—David J. Bagnell
Attorney, Agent, or Firm—Shapiro and Shapiro

[57] ABSTRACT

In a plastic-surrounded bearing in which a pulley made of plastic wider than the width of the outer race of the bearing and provided with extended portions on the opposite sides of the outer race is integrally coupled to the outer race of the bearing by insert injection molding, the pulley has gates for pouring plastic therethrough in one end surface thereof, recesses are provided at a plurality of circumferential locations between the inner peripheral edge and the outer peripheral edge of the end surface of the extended portion of the pulley, and the plastic portions lying between the recesses are reinforcing ribs, the thickness of the ribs between the adjacent recesses in at least one end surface is made greater in the circumferential direction away from the gates.

2 Claims, 3 Drawing Figures

PLASTIC-SURROUNDED BEARING

BACKGROUND OF THE INVENTION

1. Field of the Invention

This invention relates to a plastic surrounded bearing comprising a bearing portion and a pulley portion made of plastic, and in particular to a plastic-surrounded bearing of a structure in which localized dimensional contraction is prevented after injection molding.

2. Description of the Prior Art

A so-called plastic-surrounded bearing in which a pulley made of plastic is integrally coupled to the outer race of the bearing by injection molding is well known and is generally used in a pulley or the like.

Practised as a method for manufacturing such plastic-surrounded bearing is, for example, a method whereby a finished bearing is pre-inserted into a plastic forming mold and molten plastic under high pressure is injection-poured into said forming mold from a nozzle through a gate to thereby accomplish molding, that is, the so-called insert molding method.

However, the pulley portion begins to cool from immediately after it is injected out of the nozzle, but the cooling progresses from the surface toward the interior of the pulley after the plastic has been poured into the forming mold and therefore, the portion of small thickness cools quickly and the portion of great thickness cools slowly. Accordingly, that portion of great thickness of the pulley portion which cools last after molding pulls the surrounding plastic when it solidifies and therefore, great localized dimensional contraction takes place in that portion of great thickness. Where the volume of the pulley portion is relatively great, if there is provided a plurality of gates and plastic is poured in therethrough, the plastic poured in through the respective gates forms a merging portion in a bisecting plane substantially equidistant from adjacent gates and weld lines are created in that portion.

In the portion of said weld lines, the plastic has already been considerably cooled and merged when the molding has been completed and therefore, as compared with the other portions, it is difficult for dimensional contraction to take place, and this portion results in a convex portion.

In the case of a use in which this convex portion is in contact with other part, for example, in a case where a belt moves over the outer peripheral surface of a pulley, the pulley may be damaged or vibrations may be induced and therefore, it becomes necessary to finish the outer peripheral surface of the pulley into a smooth surface. Also, said weld lines merge with one another after the plastic has been considerably cooled and therefore, they are weak in strength as compared with the other portions and may sometimes be reduced in strength as much as 70%.

FIG. 1 of the accompanying drawings illustrates the heretofore used pulley of plastic and a plastic pouring device for forming the same to eliminate the above-noted disadvantage peculiar to the well-known technique.

As shown in FIGS. 1 and 2 of the accompanying drawings, a pulley 6 made of plastic is made integral with the outer race 1 of a bearing B comprising an outer race 1, an inner race 2, balls 3, a retainer 4 and a seal 5, by insert molding. The pulley 6 has a main portion 61a radially surrounding the outer periphery of the outer race 1, and axially extended portions axially extending from said main portion 61a toward the opposite sides beyond the end surfaces of the outer race 1 and having the end surfaces of the outer race 1 embedded therein, the axially extended portions being integral with the main portion 61a.

Each of these axially extended portions has axially outwardly opening recesses 62a at circumferentially equally angled positions. That is, each extended portion has ring-like portions 60a and 60b extending toward the outer periphery side and the inner periphery side and an equally angled rib 63a radially connecting these two ring-like portions 60a and 60b and forming said recess 62a therebetween, and uniformizes the dimensional contraction of the pulley 6 as much as possible and provides moderate rigidity against the load from a belt or the like moving over the outer peripheral surface of the pulley.

As shown in FIG. 1, in a portion of the molten plastic pouring device for forming such pulley 6, there is a sprue S as indicated by dotted line at the center thereof, and five runners R1 extend radially from the sprue to uniformize the cooling as much as possible, and the tip end of each of the runners connects to a first gate Ga which provides the plastic inlet port of the pulley, said first gate being provided near the inner peripheral edge of the end surface portion of the pulley, namely, in the end surface portion of the ring-like portion 60b. The inner peripheral portion 60b of said extended portion juxtaposed with the end surface of the outer race 1 from the first gate Ga provides a ring-like runner R2. The radially outer portion of this ring-like runner R2 is the axially extended portion 60a of the pulley portion 61a. The ribs 63a between this ring-like runner and the axially extended portion 60a have also the function as a second gate which connects the ring-like runner R2 to the pulley portion 61a. These ribs as the second gate are circumferentially formed with an equal width and at an equal pitch, as previously described.

Regarding the recess 62a formed between adjacent ribs, it is desirable that the end surface of the outer race be exposed in order that plastic may preferably flow from the ring-like runner into the pulley portion only through the second gate.

Also, in the end surface of the pulley which is opposite to the gate Ga, recesses 62a and reinforcing ribs 63a similar to those on that side which is adjacent to the gate are formed to uniformize the dimensional contraction.

When molten plastic is poured in from said sprue to form a pulley of such shape, the flow of the molten plastic passes through the five runners R1 as indicated by arrows, and is poured into the first gates Ga, and the molten plastic flows chiefly circumferentially in the ring-like runner R2 and, each time the plastic arrives at the second gates 63a, it flows into the pulley portion 61a, and if, for example, one of the five first gates is called the gate a and the adjacent gate is called the gate b, the molten plastic poured in from the gate a and the plastic poured in from the gate b dividedly flow in two circumferential directions in the ring-like runner, and the dividedly flowing plastics pass through the ring-like runner and said second gates, whereafter in the pulley portion, they merge with each other in the bisecting plane Fa of the gates a and b, thereby forming a merging plane. This holds true of each first gate and thus, total five merging planes are formed. After its inflow, the plastic begins to cool with the lapse of time, and in the merging planes Fa, a reduction in pressure and temperature progresses as compared with the time of pouring in, but by a number of gates being provided, a great difference does not occur between the temperatures of the various portions and moreover, by providing the recesses, the thickness is uniformized as much as possible and therefore, creation of localized dimensional contraction and convex portions 64a harmful to the merging planes is reduced if not eliminated. However, if the number of the first gates is increased, the dimensional accuracy of the pulley portion will be correspondingly improved.

However, in the above-described example of the prior art, the presence of five first gates requires the presence of five runners, and this results in the problem of reduced yield of the material which in turn adversely affects the cost of the product.

SUMMARY OF THE INVENTION

It is an object of the present invention to provide a plastic-surrounded bearing in which, without the number of the first gates being increased, localized dimensional contracion is not produced in the outer periphery of a pulley or convex portions are not produced on plastic merging planes.

To achieve such an object, the present invention provides the following means: a plastic-surrounded bearing in which a pulley of plastic wider than the outer race of the bearing and provided with extended portions on the opposite sides of the outer race is integrally coupled to the outer race of the bearing by insert injection molding, the pulley has gates for pouring plastic therethrough in one end surface thereof, recesses are provided at a plurality of circumferential locations between the inner peripheral edge and the outer peripheral edge of the end surface of the extended portion of the pulley, and the plastic portions between the recesses are reinforcing ribs, characterized in that the thickness of the ribs between the adjacent recesses in at least one end surface is made greater in the circumferential direction away from the gates.

According to the above-described means, the thickness of at least the ribs 63n between the adjacent recesses 62n is made greater in the circumferential direction away from the gates, whereby the control for uniformizing the amount and speed at which plastic poured in from the gates G is poured into the pulley 61 becomes possible.

DESCRIPTION OF THE PREFERRED EMBODIMENT

An embodiment of the present invention will hereinafter be described with reference to the drawings.

Figure 1:
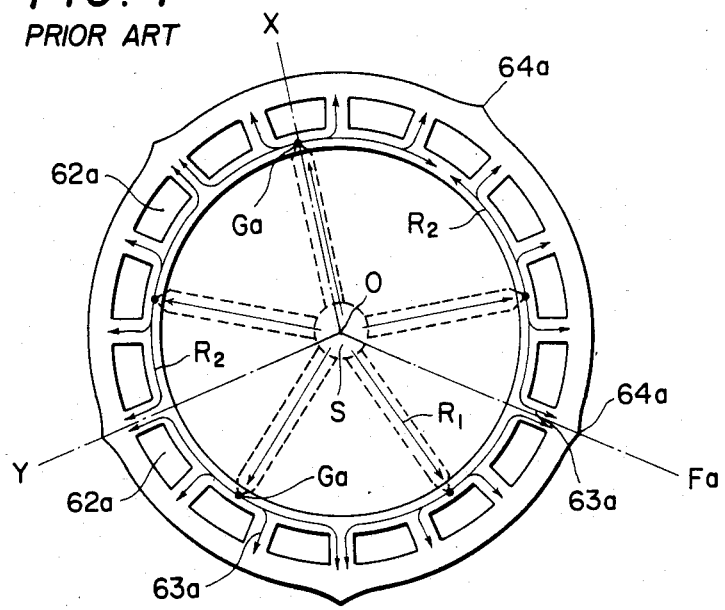
FIG. 1 illustrates an insert-molded pulley of resin and a portion of a molten plastic pouring device in the prior art.
Figure 2:
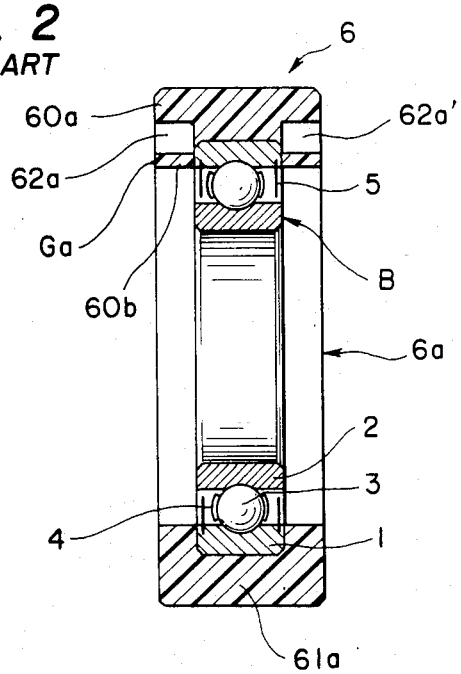
FIG. 2 is a cross-sectional view taken along line XOY of FIG. 1 and showing the pulley with the molten plastic pouring device being omitted.
Figure 3:
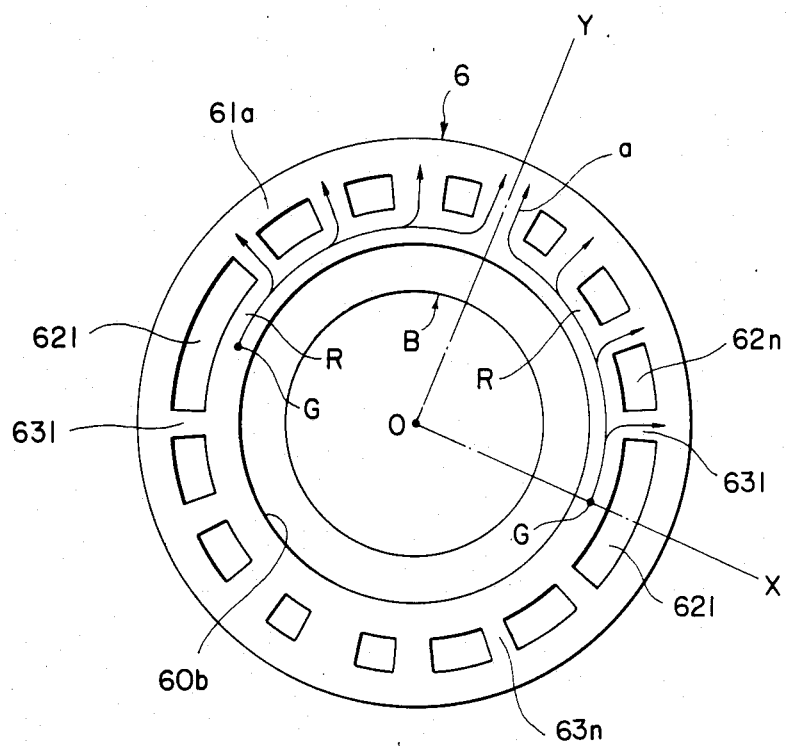
FIG. 3 schematically illustrates an embodiment of the present invention.

FIG. 3 is a front view showing an embodiment of the present invention and corresponding to FIG. 1. Again in the present embodiment, a cross-sectional view taken along line XOY of FIG. 3 is similar to FIG. 2.

Referring to FIGS. 2 and 3, a pulley 6 of plastic provided with extended portions 60a and 60b on the opposite sides of the outer race 1 of a bearing B comprising an outer race 1, an inner race 2, balls 3, a retainer 4 and a seal 5 is made integral with the outer race 1 of the bearing B by insert molding.

This pulley 6 is such that gates G are provided on the surface of a ring-like runner R at two circumferentially equally divided positions so that one of the portions 60b which contact the end surface of the outer race provides the ring-like runner R, and molten plastic is poured in from these gates.

Recesses 62n (n represents the order of the recesses and n=1, 2, 3, . . . ) are provided between the outer periphery side extended portion 60a of a pulley portion 61a which extends axially from the end surface of the outer race and the inner periphery side extended portion 60b which provides said ring-like runner R. These recesses are such that the length of the recess 621 (when n=1) close to the gate position is longest in the circumferential direction and they become progressively shorter toward the bisecting plane of the two gates. That is, the plastic portion between adjacent recesses has the function of forming reinforcing ribs 63n (n represents the order of the ribs and n=1, 2, 3, . . . ) when the pulley is subjected to a load by a belt or the like and at the same time the function as a second gate for the plastic flowing from the ring-like runner R to the pulley portion 61a. The rib 631 (when n=1) nearest to the first gate G is smallest in circumferential thickness and the ribs become progressively thicker toward the bisecting plane, the rib on the bisecting plane being thickest. The plastic poured into the two gates G via an unshown sprue and the runner dividedly flows to the right and left at the ring-like runner R, and the plastic immediately after poured into the first gate G is highest both in pressure and temperature and gradually becomes lower in pressure and temperature, but since the rib near the bisecting plane is thicker than the rib nearest to the first gate G, the squeezing efficiency is low relative to the flow of the plastic, that is, it becomes easy for the plastic to pass through the second gate as it approaches the bisecting plane from the first gate G.

Accordingly, the squeezing efficiency is low even on the rib in the bisecting plane wherein both pressure and temperature are reduced and therefore, the resin passes easily therethrough. This state is indicated by arrow a, the thicker portion of which shows that the flow rate is great.

Therefore, if the thickness of each of the second gates 63n appropriately, the flow rate in each gate is uniformized from the relation between pressure and temperature and the plastic flowing into the pulley portion through each gate does not cause unbalance in degree of cooling in the circumferential direction during the cooling because the temperature of the plastic after having flowed into the pulley portion is uniformized.

Although, in the present embodiment, the number of the first gates is two, it may be suitably selected depending on the volume of the plastic portion.

Also, if the radial thickness of the ring-like runner R is gradually increased from the first gates toward the bisecting plane, the plastic can quickly arrive at a merging plane when it flows through the ring-like runner R, and the cooling of the pulley portion is further uniformized and dimensional contraction becomes uniform.

As is apparent from the foregoing description, in the present invention, the thickness of the rib between the adjacent recesses in at least one end surface of the pulley is made greater in the circumferential direction away from the first gates.

Thus, according to the present invention, the plastic poured via the sprue, the runner and the first gates flows into the pulley portion from the ring-like runner through the second gates different in squeezing efficiency and therefore, cooling of temperature is uniformly effected over the circumferential direction of the pulley portion and localized contraction does not take place and therefore, no convex portion is produced on the merging plane and dimensional contraction is generally uniform, and this leads to the elimination of the necessity of the finishing work and to the possibility of putting the product into practical use only in its molded state. Moreover, the number of the first gates can be reduced and therefore, the sprues and runners which do not provide products may be small in quantity, and this leads to the possibility of providing economical plastic-surrounded bearings which are high in yield.

We claim:

1. A plastic-surrounded bearing in which a pulley made of plastic wider than the width of the outer race of the bearing and provided with extended portions on the opposite sides of the outer race is integrally coupled to the outer race of the bearing by insert injection molding, said pulley has gates for pouring plastic therethrough in one end surface thereof, recesses are provided at a plurality of circumferential locations between the inner peripheral edge and the outer peripheral edge of the end surface of the extended portion of said pulley, and the plastic portions lying between said recesses are reinforcing ribs, characterized in that the thickness of the ribs between the adjacent recesses in at least one end surface is made greater in the circumferential direction away from the gates.

2. A plastic-surrounded bearing according to claim 1, characterized in that the thickness of the ribs is made greater toward the bisecting plane of adjacent gates.

* * * * *